Feb. 25, 1936.  A. F. HEGENBERGER ET AL  2,031,601
SEXTANT
Filed June 7, 1934
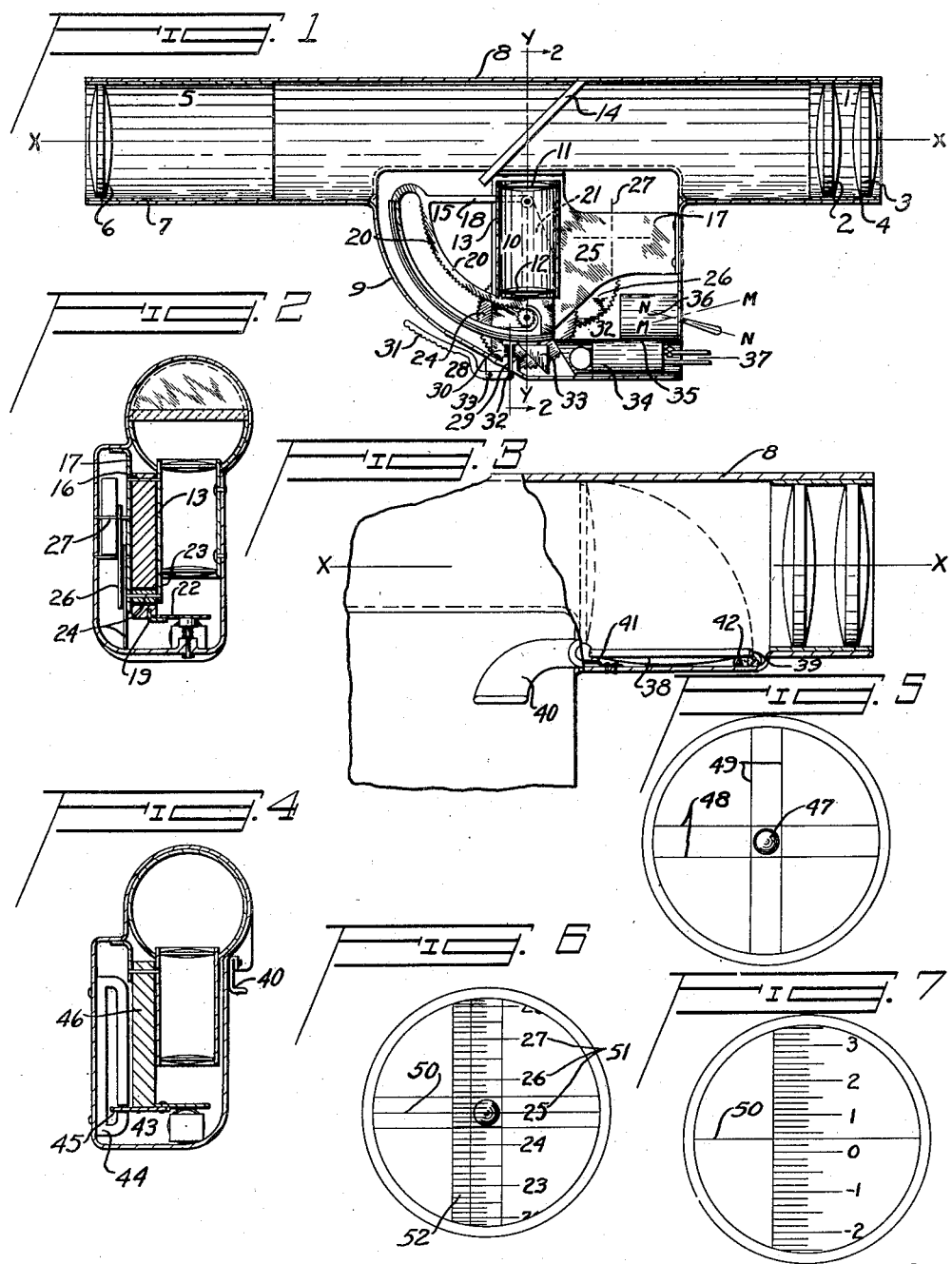
INVENTORS
ALBERT F. HEGENBERGER
ANDREW W. KNISLEY
BY
ATTORNEYS Patented Feb. 25, 1936

2,031,601

UNITED STATES PATENT OFFICE 2,031,601

SEXTANT

Albert F. Hegenberger and Andrew W. Knisley,
Dayton, Ohio

Application June 7, 1934, Serial No. 729,467

4 Claims. (Cl. 88—2.2)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to instruments especially adapted for use in measuring angles and more particularly to instruments generally known as sextants or octants, depending upon the maximum angle which can be measured.

It is a principal object of our invention to provide a simple and practical instrument of the character described whereby the angular altitudes of celestial bodies or the angular altitude of any elevated object may be determined in daylight or darkness, quickly, conveniently and with a high degree of accuracy.

Another object of our invention is to reduce to a minimum the possibility of inadvertently observing the wrong body, through employment of direct alignment between the observer's eye, the longitudinal axis of the telescope and the specific body under observation.

A further object of our invention is to provide an instrument of the character described which requires employment of but one hand to accomplish observation of a desired body.

Our invention also makes possible immediate or delayed reading of the angular altitude of the body referred to in the preceding paragraph.

In our invention we have further accomplished great simplicity in the number and operation of working parts, to the end that we have produced an instrument compact in form, light in weight, and entirely automatic in its operation.

With the foregoing and other objects in view, which will appear as the description proceeds, the invention consists of certain new and novel improvements in sextants, which will be hereinafter more fully illustrated and described in the accompanying drawing and more particularly pointed out in the appended claims.

Referring to the drawing, in which numerals of like character designate similar parts throughout the several views:

Fig. 1 is a side view of our invention in partial cross-section.

Fig. 2 is a sectional view taken on the line 2—2 of Fig. 1.

Fig. 3 shows a modification applicable to the microscope objective.

Fig. 4 shows a modification in pendulum dampening means.

Fig. 5 indicates, diagrammatically, observation of a body in space.

Fig. 6 is a duplicate of Fig. 5 with graduated scale illuminated.

Fig. 7 indicates, diagrammatically, illumination of the graduated scale, following observation of a body.

In Fig. 1, an eye piece 1, composed of lenses 2 and 3, mounted in a housing 4, and a telescope objective 5, composed of a lens 6 mounted in a housing 7, are coaxially mounted in opposite extremities of a tube 8. The lower mid portion of the tube 8 extends downwardly to form a housing 9 for encasing, among other things, a microscope objective 10, composed of lenses 11 and 12 mounted in a housing 13, fixedly secured to the housing 9. It will be noted that the longitudinal axis $x$—$x$ of the tube 8 and similar axis $y$—$y$ of the microscope objective 10 intersect and lie at right angles to one another. A plane glass reflector 14 is positioned at an angle of 45 degrees to the longitudinal axes $x$—$x$ and $y$—$y$ such that their common point of intersection lies upon that surface of the plane glass reflector 14 which is adjacent to said microscope objective 10.

Referring jointly to Figs. 1 and 2, a pendulum 15 is mounted within the housing 9 by means of a journal 16 secured at its one extremity to the housing 13 and at its other extremity to a partition 17 attached to the housing 9. The pendulum 15 is composed of a back 18, having an outturned flange 19 and rack 20, of a counterweight 21 and of a translucent scale 22. The lower extremity of the housing 13 is provided with a lug 23, adapted to support one end of a pinion-and-gear assembly 24 of a dampening mechanism 25. The other end of the assembly 24 is supported by the partition 17, which in combination with a side wall of the housing 9 further supports a second pinion-and-gear assembly 26, as well as a pinion-and-impeller assembly 27. The several parts of the mechanism 25 so cooperate with one another that slight movement of the pendulum 15 about its journal 16 causes appreciable rotation of the impeller portion of the assembly 27. A dual purpose is served by the foregoing dampening mechanism 25. Positive dampening of pendulum oscillations is obtained as well as correctional effect against bearing lag as the pendulum 15 seeks to overcome the last slight angular discrepancy from true vertical, by utilizing the inertia present in the last several turns of the impeller portion of the assembly 27.

The pendulum 15 is normally fixed, with reference to the housing 9, by means of a locking mechanism 28 provided at the lower central portion of the housing 9. The aforesaid mechanism is composed of a shoe-and-rod assembly 29, a compression spring 30, an operating lever 31 and pins 32 and 33. Upward movement of the handle portion of the operating lever 31 against the bottom of the housing 9 frees the pendulum 15 for movement about the journal 16, with accompanying actuation of the dampening mechanism 25. An illuminating system 32, composed of a prism 33, a lamp 34, a lamp housing 35 and a toggle switch 36, is fixed to the bottom portion of the housing 9, adjacent to the locking mechanism 28. Wires 37 project rearwardly from the bottom of the housing 9 and are operatively connected with a storage battery carried in the pocket or otherwise secured to the clothing of the operator of our invention.

In Fig. 3 an auxiliary lens 38 has been introduced at the aft bottom portion of the tube 8, to simplify the optical arrangement of Fig. 1. The lens 38 is held in a frame 39, pivotally secured to the housing 9 and actuated by means of a lever 40. A spring catch 41 and pad 42 are provided to secure the frame 39 in the position shown in Fig. 3. The spring catch 41 is also adapted to secure the frame 39 in a position normal to the longitudinal axis x—x of the tube 8.

In Fig. 4, the dampening mechanism 25, shown in Figs. 1 and 2, has been replaced by a magnetic dampening mechanism 43. The latter mechanism is composed of a D magnet 44 fixedly secured to the housing 9 and a soft iron sheet 45 secured to the base of a simple vertically-hanging weight 46. The weight 46, being symmetrically disposed about the axis y—y, in side profile, performs the same functions as the pendulum 15. Fig. 4 also shows an end view of the lever 40, with the frame 39 held parallel to the axis x—x of the tube 8.

Fig. 5 indicates diagrammatically the image which meets the eye of an observer, upon alignment of the axis x—x with a body 47, suspended in space. It will be noted that the aforementioned alignment places the body 47 within the inner square formed by horizontal cross-hairs 48 and vertical cross-hairs 49.

Assuming the observer presses the handle portion of the operating lever 31 against the bottom of the housing 9, with the axis x—x still in the alignment shown in Fig. 5 and with the handle of the toggle switch 36 coincident with axis M—M a second image of the translucent scale 22 will be superimposed over the image of the body 47, as shown in Fig. 6. It will be noted that the microscope objective 10 is provided with a horizontal cross-hair 50, that numerals 51 are furnished for each degree of elevation and that six subdivisions 52 are introduced between each degree of elevation in order that five-minute deviations in elevation may be readily observed. From reference to Fig. 6, it will be observed that the angular altitude of the body 47 is 25 degrees and no minutes.

Let it be further assumed that the observer lowers the axis x—x into approximate alignment with the horizon and releases the operating lever 31. The translucent scale 22 is locked against movement and the reading no degrees and 20 minutes recorded thereon may be referred to at leisure, by placement of the handle of the toggle switch 36 coincident with the axis M—M and observation through the eye piece 1.

The operation of our device is as follows. The operator grasps the tube 8 and housing 9 in one hand and elevates the same until the axis x—x is brought into alignment with the operator's eye and the body under observation. He thereupon releases the pendulum 16 by means of the operating lever 31. Under gravitational influence the longitudinal axis y—y of the pendulum 21 will seek to assume the true vertical. As has been previously stated, the dampening mechanism 25, not only serves to hasten the pendulum's ultimate assumption of "true vertical", but also tends to carry the pendulum 21 through that minute "angular lag" produced by the unavoidable presence of some friction introduced by the journal 16. The operator next releases the operating lever 31, thus locking the translucent scale 22 against movement, pending reading of the same at leisure, or he may position the handle of the toggle switch 36 coincident with the axis M—M for immediate determination of scale reading.

With illumination of the lamp 34, light rays are projected forward into the prism 33 and from the angularly disposed face thereof are reflected upwardly against the bottom surface of the translucent scale 22, rendering the top surface thereof luminous. The microscope objective 10 causes an image of the illuminated translucent scale 22 to be projected against the glass reflector 14, from whence the image is reflected into the eye piece 1, and from thence into the eye of the operator.

We claim:

1. In a sextant having a housing and a bi-portioned means for simultaneously producing images of an observed object and the reading of its elevation above the horizon in a common focal plane, the indicating portion of said means comprising, a pendulum having a gear sector and including a protractor of arced ribbon form, manually releasable means for normally securing said pendulum against movement relative to said housing, lighting means disposed within said housing for illuminating a portion of said protractor, an impeller, and a train of gears connecting said gear sector with said impeller such that angular displacement of the former causes rotation of the latter.

2. In a sextant having a housing and a bi-portioned means for simultaneously producing images of an observed object and the reading of its elevation above the horizon in a common focal plane, the indicating portion of said means comprising, a pendulum having a gear sector and including a translucent protractor in the form of an arced ribbon, manually releasable means for normally securing said pendulum against movement relative to said housing, lighting means disposed within said housing for illuminating a portion of said protractor, an impeller, and a train of gears connecting said gear sector with said impeller such that angular displacement of the former causes rotation of the latter.

3. In a sextant having a housing and a bi-portioned means for simultaneously producing images of an observed object and the reading of its elevation above the horizon in a common focal plane, the indicating portion of said means comprising, lighting means disposed within the base of said housing including a prism for light ray deflection normal to the longitudinal axis thereof, means for projecting said light rays into the focal plane of said observed object, a pendulum having a gear sector and including a translucent protractor of arced ribbon form interposed between said prism and said light ray projecting means such that said light rays will project a predetermined portion of said protractor into the focal plane of said observed object, manually releasable means for normally securing said pendulum against movement relative to said housing, an impeller, and a train of gears connecting said gear sector with said impeller such that angular displacement of the former causes rotation of the latter.

4. In a sextant having a housing and a bi-portioned means for simultaneously producing images of an observed object and the reading of its elevation above the horizon in a common focal plane, the indicating portion of said means comprising, lighting means disposed within the base of said housing including a prism for light ray deflection normal to the longitudinal axis thereof, means for projecting said light rays into the focal plane of said observed object, a pendulum having a soft iron sheet of arced ribbon form and including a translucent protractor of similar form and in overlapping engagement therewith, and a magnet fixed to said housing with open ends adjacently disposed, said protractor being interposed between said prism and said light ray projecting means such that said light rays will project a predetermined portion of said protractor into the focal plane of said observed object and said iron sheet being interposed between the open ends of said magnet such that secondary oscillations of said pendulum are dampened.

ALBERT F. HEGENBERGER.
ANDREW W. KNISLEY.